(12) United States Patent
Foord et al.

(10) Patent No.: US 7,376,324 B2
(45) Date of Patent: May 20, 2008

(54) FIBER TRAY

(75) Inventors: Keith Roy Foord, Hamilton (CA); Rudolf Hora, Toronto (CA)

(73) Assignee: Opto-Electronics Inc., Hamilton (CA)

( * ) Notice: Subject to any disclaimer, the term of this patent is extended or adjusted under 35 U.S.C. 154(b) by 0 days.

(21) Appl. No.: 11/584,838

(22) Filed: Oct. 23, 2006

(65) Prior Publication Data

US 2008/0095510 A1  Apr. 24, 2008

(51) Int. Cl.
*G02B 6/00* (2006.01)

(52) U.S. Cl. ........................ 385/135; 385/134

(58) Field of Classification Search ............... 385/135
See application file for complete search history.

(56) References Cited

U.S. PATENT DOCUMENTS 4,753,499 A * 6/1988 Malkani et al. ............. 385/135
5,884,003 A * 3/1999 Cloud et al. ................ 385/135
2007/0047892 A1* 3/2007 Bayazit et al. .............. 385/135

* cited by examiner

*Primary Examiner*—Frank G Font
*Assistant Examiner*—Ryan Lepisto
(74) *Attorney, Agent, or Firm*—Kurt J. Fugman (57) ABSTRACT

A fiber tray is provided for installing fiber optic cable and other types of cable that are vulnerable to performance losses if a certain minimum bend radius is not maintained. The fiber tray allows a user to create a subassembly that maintains bend radius control while easing assembly. The construction of the fiber tray also minimizes the depth of the tray and gives freedom to the user to vary the routing patterns of the cable so that a component that is attached to the end of the cable can be located at a predetermined spot on the tray.

24 Claims, 7 Drawing Sheets

FIBER TRAY

BACKGROUND OF THE INVENTION

Fiber optic cables and other cables such as CAT5 cable require that users do not bend them pass a certain amount, otherwise performance losses will be induced. This characteristic of a cable is referred to as the minimum bend radius. For example, the minimum bend radius for CAT5 cable is one inch and it is 50 mm for SMF-28 fiber optic cable when light waves having a wavelength of 1550 nm are passing through it. Any network or test instrument using these types of cable needs to maintain these minimum bend radii, otherwise the performance of the network or test instrument will be compromised. Maintaining bend radius control can be difficult, especially when fiber optic cable is routed within the interior of a small housing for a fiber optic test instrument. None of the previous methods for routing fiber optic cable in a test instrument have been successful for a number of reasons.

One previous method of routing fiber optic cable in a test instrument has been to wind the fiber into the bottom of one half of the housing of the test instrument and try to maintain bend radius control by hand. The cable is then taped into place. This method has several disadvantages. First, some assemblers are not knowledgeable about fiber optics and fail to understand the importance of maintaining bend radius control. Second, even knowledgeable and experienced assemblers will occasionally violate minimum bend radius because of the considerable amount of dexterity necessary to maintain bend radius control. Third, repeatedly taping the cable leads to microbends that reduce the optical power transmitted in the fiber to any bulkhead or connector. Finally, this method requires that the optical components be mounted to a circuit board. Minimum bend radius is often exceeded due to the transition from the bottom of the housing of the test instrument to the printed circuit board that is necessary during the process of connection of the fiber to the optical components. All of these problems lead to undesirable performance losses in the fiber and test instrument.

Another method that has been used to route fiber optic cable in a test instrument is to use fiber clips or routing channels. The disadvantage that these components have is that they typically only allow for one path for which the cable to follow. Given the variance in the length of cable used, this meant that optical components and splices would not be found in the desired location. This caused the assembler to bend the fiber in an effort to make the components fit into the available space. Another drawback is that these commercially available components were too tall to fit into a small housing, which limited their use.

Accordingly, there exists a need to provide bend radius control for cabling in a test instrument that allows the user to easily assemble the test instrument, locate optical components in the desired location, and minimize the space that the management of the cabling takes up in the test instrument.

SUMMARY OF THE INVENTION

The present invention satisfies the aforementioned needs by supplying a tray that comprises a sheet of material that has a plurality of holes that define a routing path for the cable to follow. A fixture with jig pins is placed under the tray such that the jig pins extend through the holes of the tray, allowing the user to route the cable around the jig pins helping to maintain minimum bend radius control. Once the cable is in its proper place, the user fastens the cable to the tray so that the cable cannot move substantially. Then, the user removes the jig pins, creating a tray and cable subassembly that is ready to be placed within a housing. Once the tray has been placed into one half of the housing, a padded member may be placed on top of the cable that is on the exposed side of the tray, protecting the cable from damage. Finally, the other half of the housing is fastened onto the first half of the housing, sealing the tray, cable, and padded member within the housing.

Alternatively, a routing channel and a second series of holes may be part of the tray such that the routing channel, second series of holes, and first series of holes define multiple routing paths, allowing the user to compensate for varying lengths of cable such that a component that is attached to the end of the cable can be located at a predetermined location should the user wish to do so. Furthermore, a clip may also be provided proximate to one of the routing paths to help hold the cable in place. This version of the tray can then be assembled into a housing with a padded member in a similar fashion as discussed above.

DETAILED DESCRIPTION OF THE PREFERRED EMBODIMENT

Figure 1:
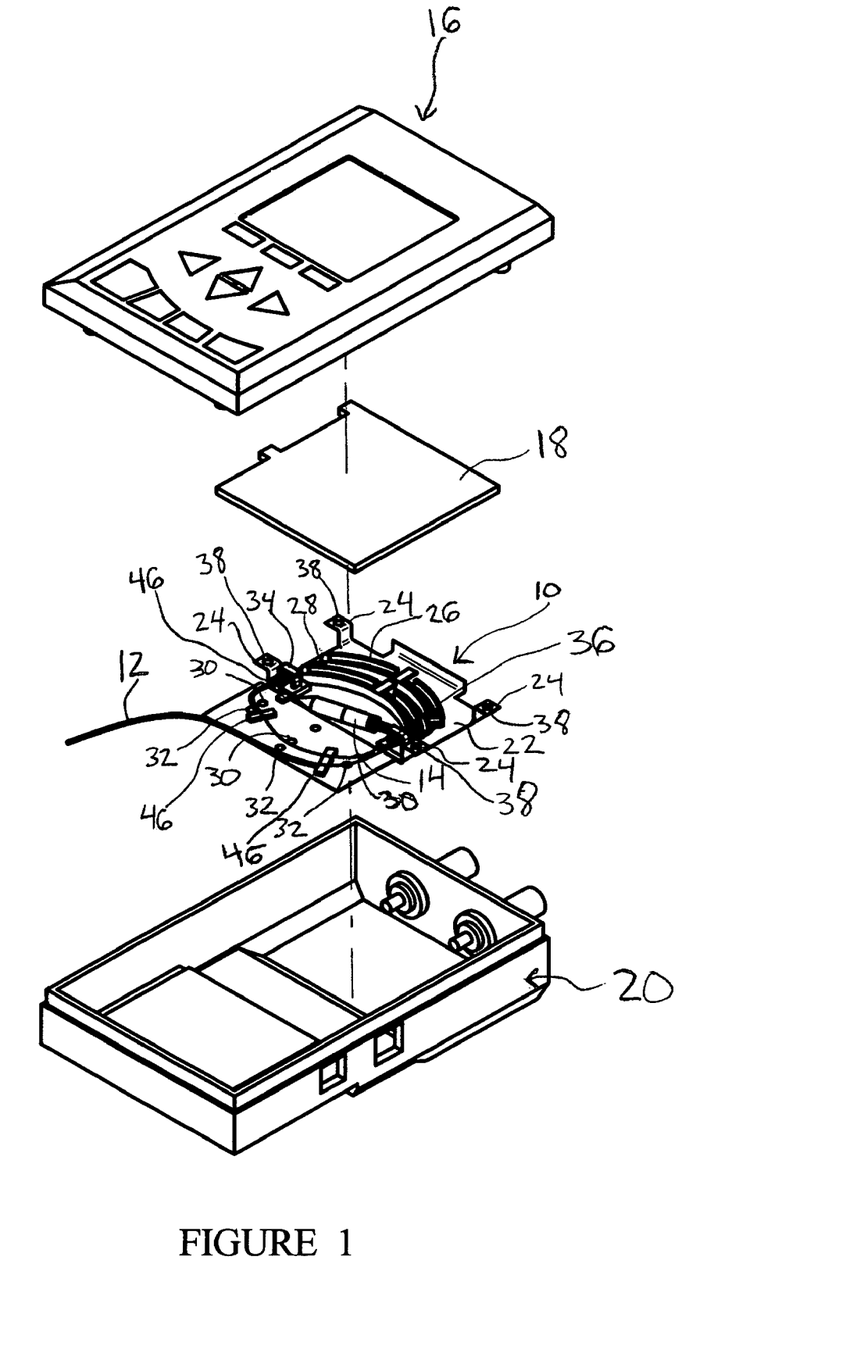
FIG. 1 is an exploded view of the tray of the preferred embodiment and a padded member being assembled into the housing of a test instrument.

Looking at FIG. 1, there is shown the preferred embodiment of the present invention. This embodiment includes a tray 10 that is made from sheet metal that is bent into the proper shape by a die. The tray 10 also has features on it which allow fiber optic cable 12 to be routed in paths having different lengths without creating any kinks in the cable 12 which would violate the minimum bend radius of the cable 12. Attached to the end of the fiber optic cable 12 is an optical component 14, such as a laser or detector, that can be located at a predetermined place so that it can be easily attached to the printed circuit board (not shown) via electrical cables (not shown) prior to the assembly of the test instrument.

As can be seen, the tray 10 and fiber optic cable 12 form a subassembly that can be located within one half of the housing 16 of the test instrument and which can be tested prior to the assembly of the test instrument, finding performance losses and preventing needless rework. After the tray 10 has been placed into the first half of the housing 16 of the test instrument, then a piece of compressed foam 18 is placed onto the exposed side of the tray 10 on top of the cable 12, protecting it from damage. Finally, the second half of the housing 20 of the test instrument is mated with the first half of the housing 16 and is fastened thereto by screws (not shown). The resulting test instrument is one free of performance losses and that can be taken apart easily for rework if desired.

Figure 2:
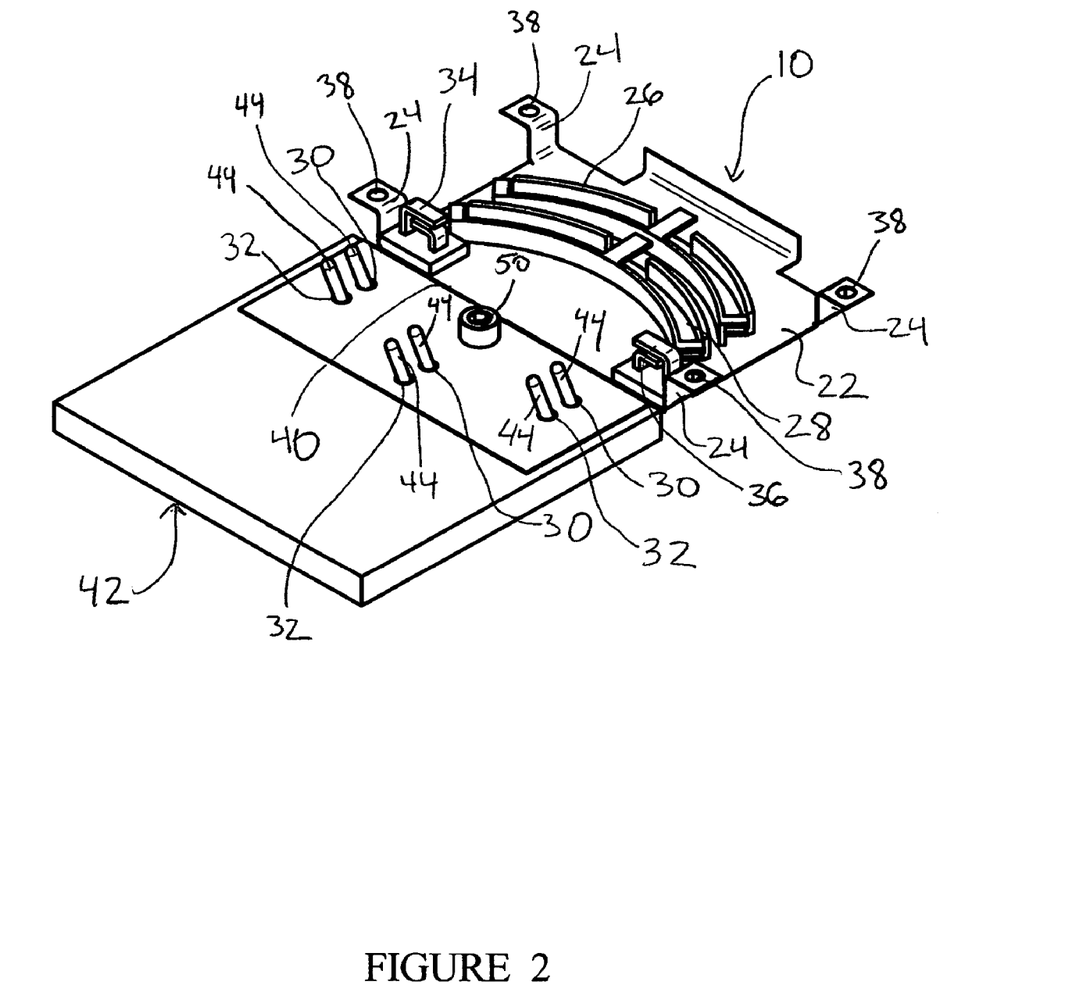
FIG. 2 is perspective view of the tray of FIG. 1 with a fixture having jig pins extending through the holes of the tray and a mounting bolt that holds the tray onto the fixture.

FIG. 2 more clearly shows that the construction of the tray 10 includes a main body 22 that has four mounting flanges 24 that extend from its sides vertically above the main body 22, an outside routing channel 26, an inside routing channel 28, an inside series of holes 30, an outside series of holes 32, a left fiber clip 34, and a right fiber clip 36. The mounting flanges 24 have holes 38 on their top surface and are located such that holes 38 will align with the screw bosses (not shown) and counterbores (not shown) of the first and second halves of the housings 16, 20 so that when the test instrument is screwed together, the mounting flanges 24 will be secured and the tray 10 will not move thereafter. The main body 22 also has a transition ramp 40 that reduces the distance vertically from the main body 22 to the top surfaces of the mounting flanges 24. This shape is complimentary to the inside surface of the first half of the housing 16 of the test instrument, which in turn is complimentary to the outside surface of the first half of the housing 16 of the test instrument. This allows the tray 10 to fit nicely within the first and second halves of the housing 16, 20 without taking up too much room. However, this also means that there is not a great deal of room to fit the fiber optic cable 12 either.

Consequently, as shown in FIG. 2, the inside series of holes 28 and outside series of holes 32 are found on the portion of the main body 22 located after the transition ramp 40 where any permanent structures for providing bend radius control are impractical. Instead, a fixture 42 is provided with jig pins 44 that are configured to extend through the inside series of holes 30 and outside series of holes 32 temporarily so that the fiber optic cable 12 can be routed around these pins 44. Once the cable 12 and any component 14 that is attached to its end have been positioned as desired, a piece of tape 46 near the first and second series of holes 30,32 and another piece of tape 46 located near the optical component 14 can be used to prevent the cable 12 from moving significantly. It should also be noted that the pins 44 are angled away from the center of the tray 10 so that any memory that is in the cable 12 will not cause the cable 12 to ride up the pins 44 and away from the main body 22 of the tray 10, making routing of the cable 12 and its attachment to the tray 10 cumbersome. It is also preferable for the tray 10 to have a mounting hole 48 that allows the user to screw the tray 10 using a mounting bolt 50 to the top of the fixture 42, ensuring that the tray 10 does not ride up on the jig pins 44 when the user is routing or attaching the cable 12. Once the fiber optic cable 12 has been routed and attached to the tray 10, the mounting bolt 50 holding the tray 10 and fixture 42 together can be removed and the fixture 42 can be separated from the tray 10. The cable 12 will then relax slightly but not enough to cause a violation of its minimum bend radius or any performance losses associated therewith.

Figure 3:
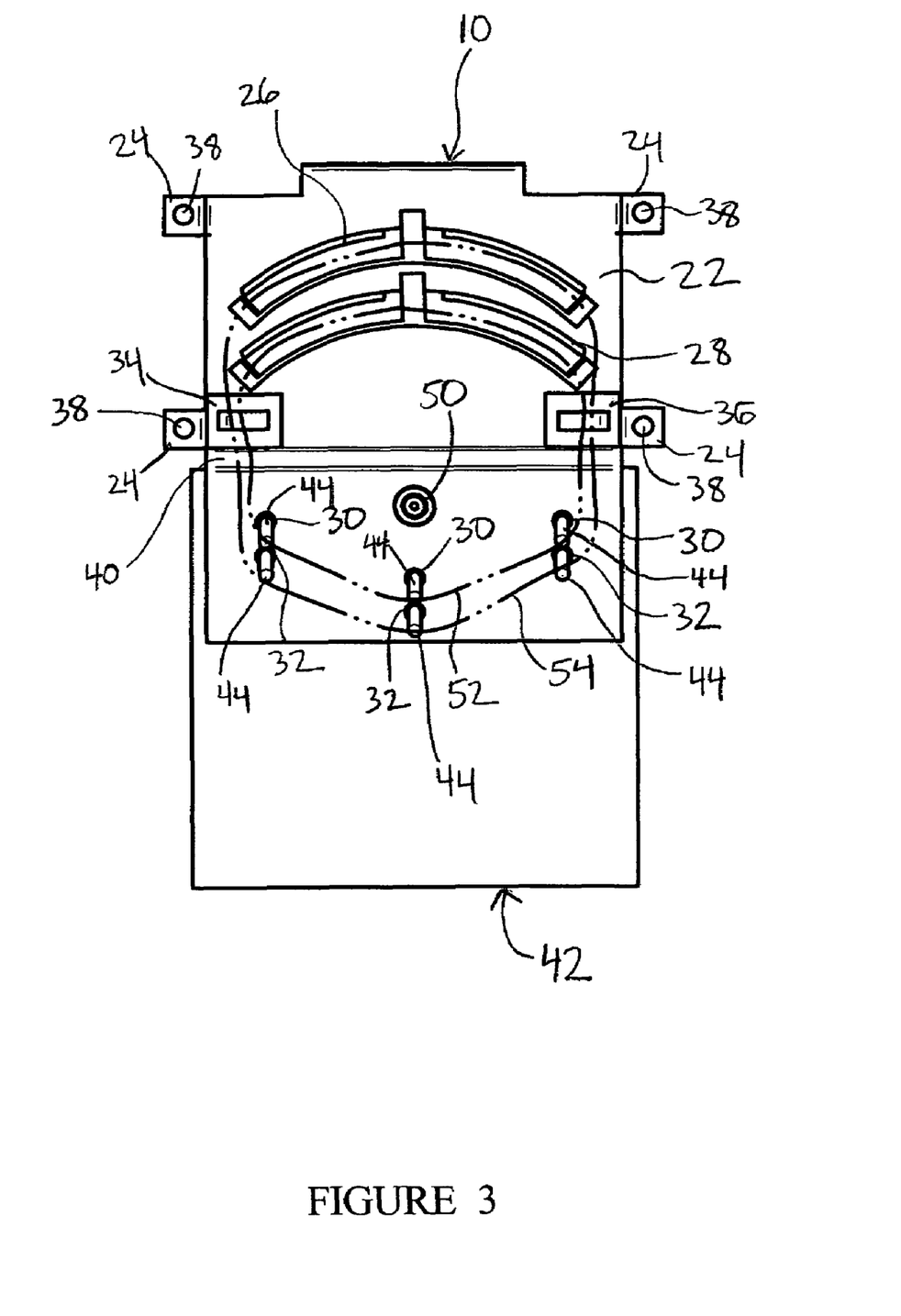
FIG. 3 is a top plan view of the tray, fixture and mounting bolt of FIG. 2 with routing paths shown prior to the routing of fiber optic cable.

FIG. 3 illustrates that the inside series of holes 30 and jig pins 44 form a first routing pattern 52 and that the inside routing channel 28 provides a pathway to continue the same routing pattern 52. Similarly, the outside series of holes 32 and jig pins 44 form a second routing pattern 54 and the outside routing channel 26 provides a pathway to continue the same routing pattern 54. Both the first and second routing patterns 52,54 consist of two different generally elliptical paths that are offset from each other with the inside and outside routing channels 28,26 being positioned opposite of the inside and outside series of holes 30,32. A third routing pattern can be achieved by winding the cable 12 around the inside series of holes 30 with jig pins 44 and the outside routing channel 26. Likewise, a fourth routing pattern can be realized by winding the cable 12 around the outside series of holes 26 with jig pins 44 and the inside routing channel 28.

Figure 4:
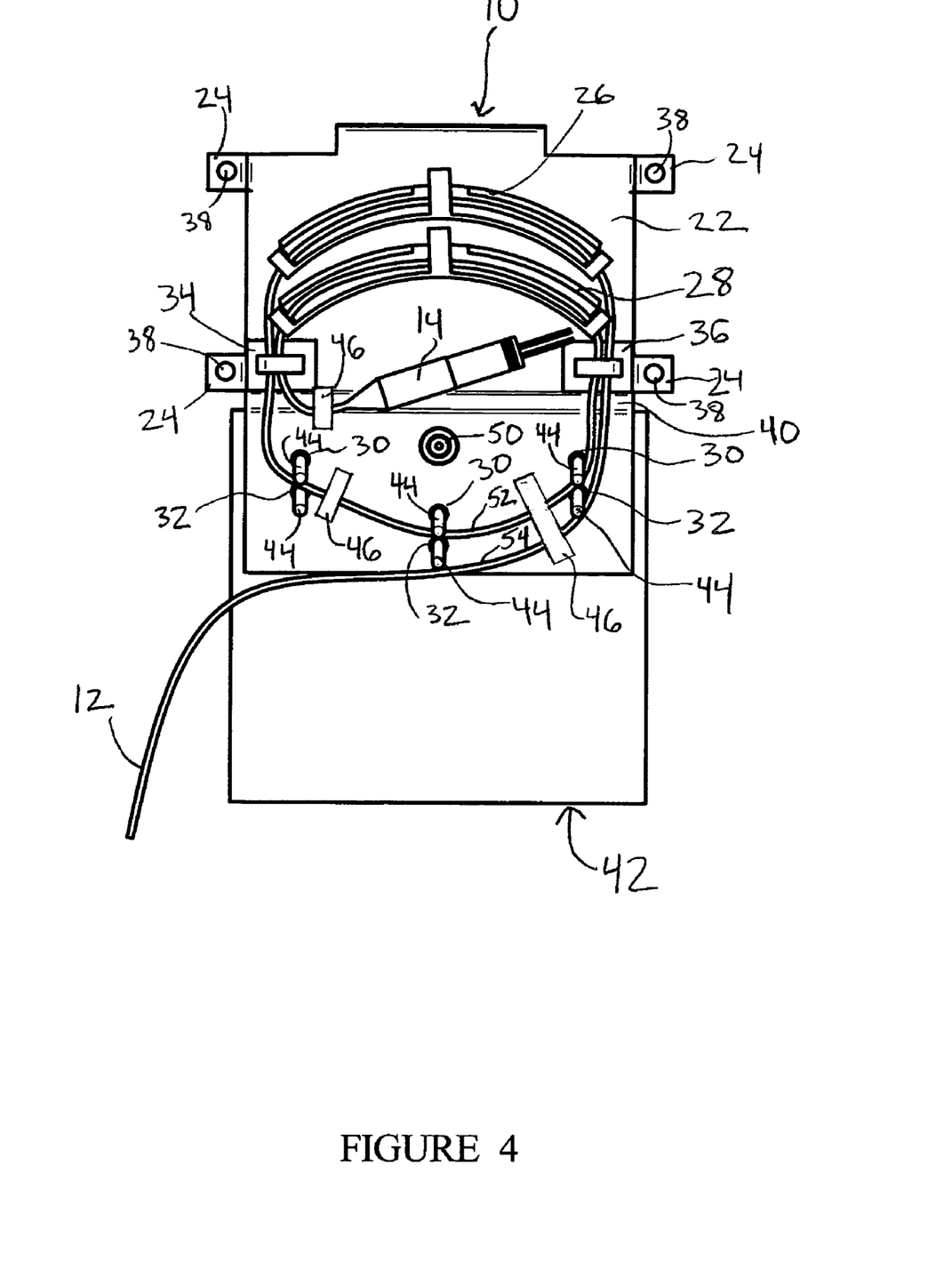
FIG. 4 is a top plan view of the tray, fixture and mounting bolt of FIG. 3 with fiber optic cable routed and taped into place.
Figure 5:
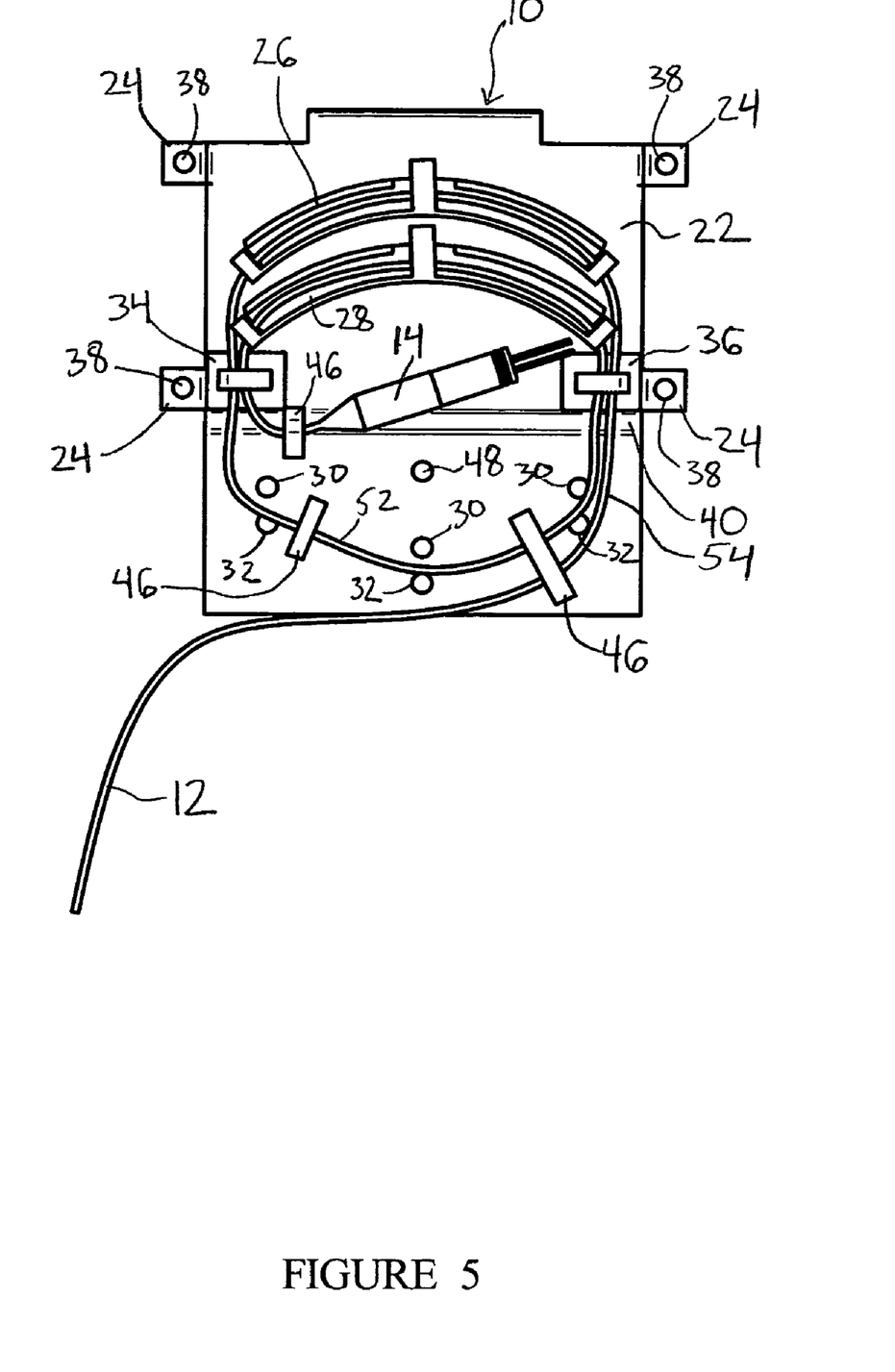
FIG. 5 is a top plan view of the tray of FIG. 4 with the fixture and mounting bolt removed.

Hence, the user has four different routes with three different route lengths from which to choose when routing the cable 12 and the component 14 that is attached to its end. So the user can compensate for long and short fiber lengths and tape the cable 12 and the component 14 that is found on its end in a predetermined spot as best seen in FIG. 4. Then the fixture 42 can be removed from the tray 10 after the mounting bolt 48 has been unscrewed (see FIG. 5).

Figure 6:
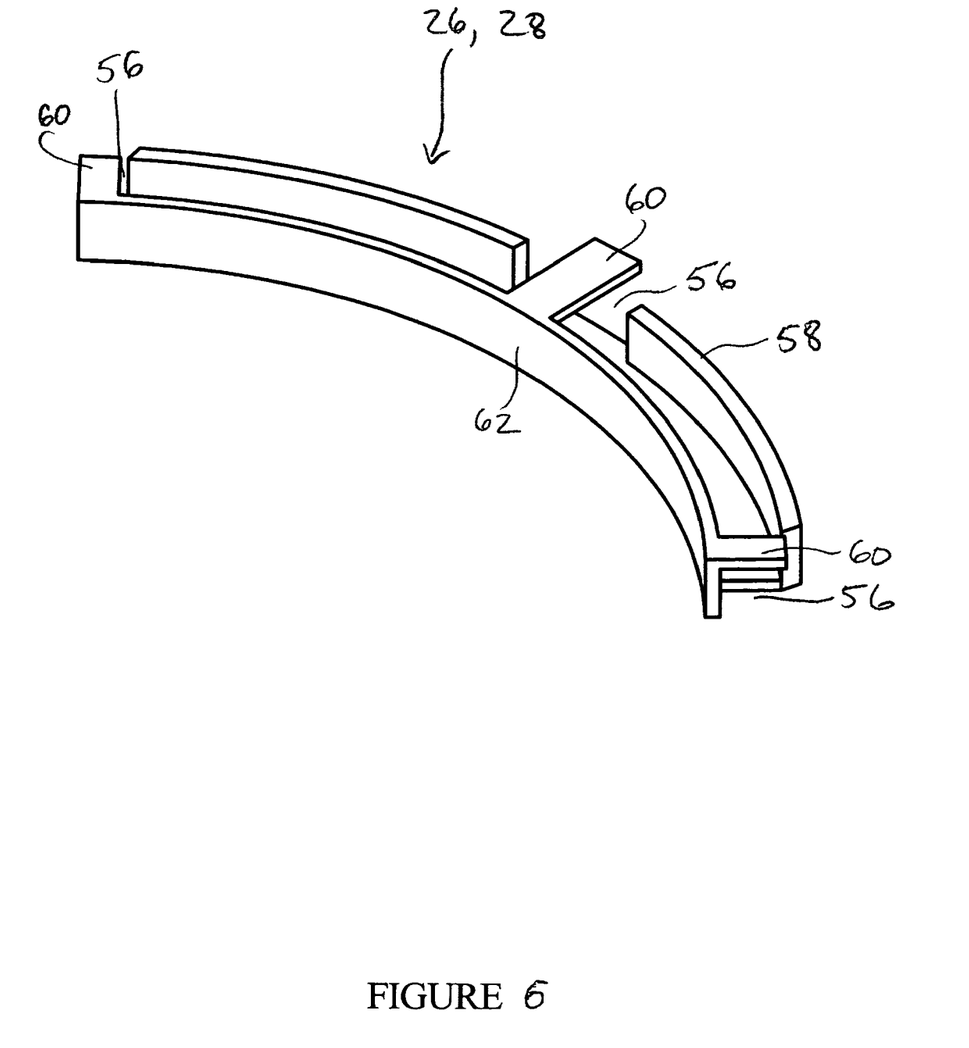
FIG. 6 is a perspective view of a routing channel.

Looking now at FIG. 6, the inside and outside routing channels 28, 26 are identical in construction and are attached to the main body 22 of the tray 10 using double sided tape (not shown). The channels 28, 26 have a C-shaped cross section that follows an arcuate path, ensuring that any cable 12 that is placed within the interior of the channels 28, 26 will not be bent to a radius that is less than its minimum bend radius. The channels 28, 26 have openings 56 near both ends and in the middle of the outside wall 58. A ledge 60 also extends from the top of the inside wall 62 directly above these openings 56. In use, a fiber optic cable 12 is slid between each ledge 60 and opening 56 consecutively until the cable 12 is continuously bound within the interior of the channels 28, 26. The ledges 60 then serve to keep the cable 12 from inadvertently falling out of the channels 28, 26 provided that the cable 12 is kept taut.

Figure 7:
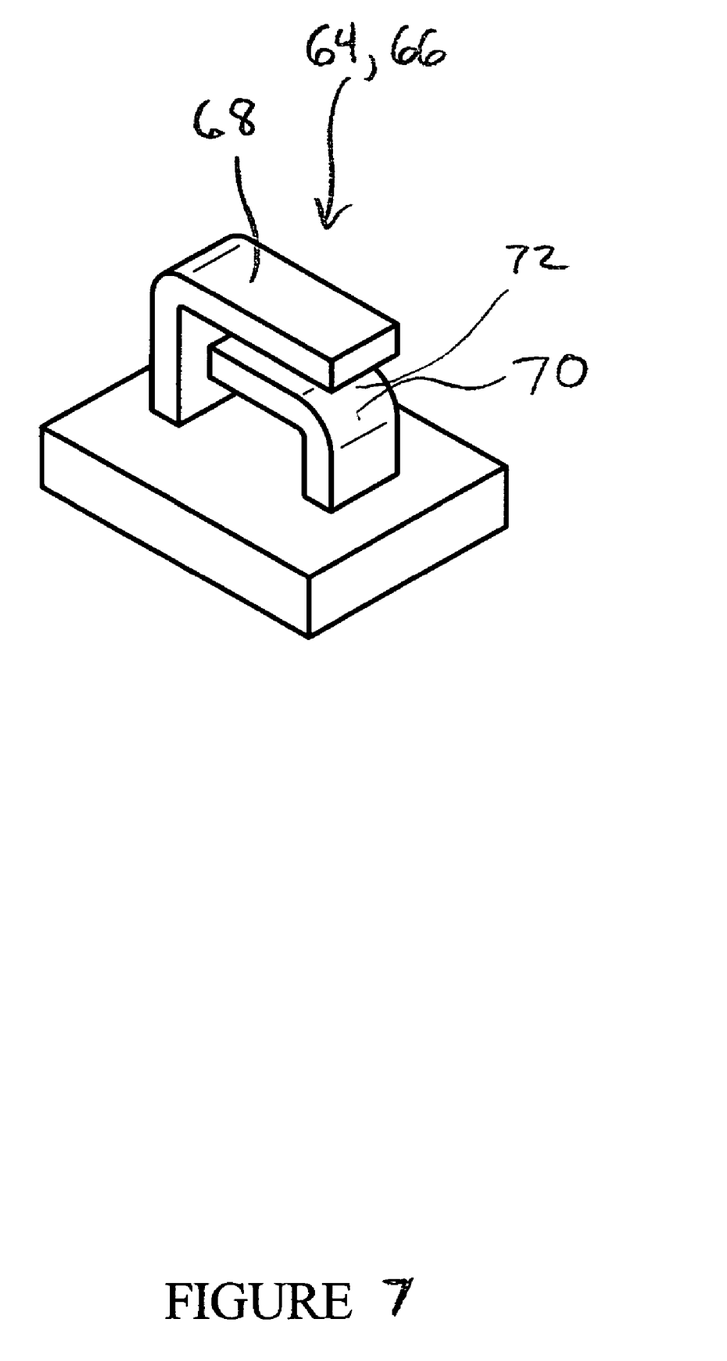
FIG. 7 is a perspective view of a fiber clip.

Finally, turning to FIG. 7, the left and right fiber clips 64, 66 are also identical in construction and are also attached to the main body 22 of the tray 10 next to two of the mounting flanges 24 by way of double sided tape (not shown) near the middle of the tray 10. Thus, the left and right fiber clips 64, 66 help to define the elliptical routing paths 52, 54 discussed previously by being placed in the gaps found between the routing channels 28, 26 and the inside and outside series of holes 30, 32. Each fiber clip 64, 66 comprises a tall L-shaped member 68 and a short L-shaped member 70 that face each other. The difference in height between the L-shaped members 68, 70 creates a gap 72 through which the cable 12 can slide to enter the clip 64, 66. Then the user pushes down on the cable 12 until it is seated underneath the short L-shaped member 70. The fiber optic cable 12 will not fall out of the clip 64, 66 at this point provided that the cable 12 is kept taut.

Both clips 64, 66 are oriented such that the gap 72 is only accessible from the inside of the tray 10. This helps to make sure that the cable 12 cannot fall out of the clip 64, 66 and ride up the mounting flanges 24 where the cable 12 could be pinched between the mounting flanges 24 and the second half of the housing 20. This would cause damage to the cable 12 and require rework. Once the cable 12 has been properly routed using the inside and outside series of holes 30, 32 with jig pins 44, the inside and outside routing channels 28,26, and the left and right fiber clips 64, 66, and after the cable 12 has been attached by tape 46 near the inside and outside series of holes 28, 30 with jig pins 44 and near the optical component 14 that is proximate to the center of the tray 10, the fixture 42 can be removed and the test instrument assembled as mentioned earlier.

As can be seen, this embodiment provides a tray 10 that can ease the assembly of a fiber optic test instrument, that can prevent any performance losses caused by kinked cable 12, that allows the user to control the location of an optical component 14 that is attached to the end of the cable 12 without kinking the cable 12, and that can minimize the space utilized within a test instrument for cable management. Of course the present invention is not limited to fiber optic cabling and could be achieved with more or fewer routing channels and clips than has been discussed. Therefore, the spirit and scope of this invention should be interpreted in view of the attached claims.

What is claimed is:

1. A tray for holding cables comprising:
   a sheet of material;
   a first series of holes in the sheet of material that form a routing pattern having a predetermined minimum bend radius for the cable;
   a first jig pin that can be inserted into one of said holes allowing a cable to be routed around the first jig pin; and
   an adhesive member that is adjacent to said hole that is empty after said first jig pin has been removed, said adhesive member engaging the cable and being attached to the sheet of material thereby holding the cable in place.

2. The tray of claim 1 which further comprises a second series of holes in the sheet of material that forms a routing pattern for the cables that is different than the routing pattern provided by the first series of holes.

3. The tray of claim 2 which further comprises a first routing channel that is attached to the sheet of material and that provides a routing pattern for the cable that substantially aligns with the routing pattern of the first series of holes and a second routing channel that is attached to the sheet of material and that provides a routing pattern for the cable that substantially aligns with the routing pattern of the second series of holes.

4. The tray of claim 2 which further comprises a plurality of jig pins that are inserted through the holes of the first and second series of holes that allow the cable to be routed around said jig pins.

5. The tray of claim 1 which further comprises a second jig pin that can be inserted into another one of said holes allowing the cable to be routed around the second jig pin and a second adhesive member that is adjacent to said last defined hole that is empty after said second jig pin has been removed, said adhesive member engaging the cable and being attached to the sheet of material thereby holding the cable in place.

6. The tray of claim 5 wherein said first and second adhesive members are pieces of tape.

7. A tray for holding cables comprising:
   a sheet of material;
   a first series of holes in the sheet of material that form a routing pattern having a predetermined minimum bend radius for the cable;
   a second series of holes in the sheet of material that form a routing pattern having a predetermined minimum bend radius for the cable that is different than the routing pattern of the first series of holes;
   a first jig pin that can be inserted into one of said holes allowing a cable to be routed around the first pin; and
   an adhesive member that is adjacent to said hole that is empty after said first jig pin has been removed, said adhesive member engaging the cable and being attached to the sheet of material thereby holding the cable in place.

8. The tray of claim 7 wherein said first series of holes and said second series of holes are in close proximity to each other and which further comprises a second jig pin that can be inserted into one of the holes of the second series of holes allowing the cable to be routed around the second jig pin and a second adhesive member that is adjacent to said hole of the second series of holes that is empty after the second jig pin has been removed, said adhesive member engaging the cable and being attached to the sheet of material thereby holding the cable in place.

9. The tray of claim 8 which further comprises a first routing channel that provides a routing pattern having a predetermined minimum bend radius for the cable that substantially aligns with the routing pattern of the first series of holes and a second routing channel that provides a routing pattern having a predetermined minimum bend radius for the cable that substantially aligns with the routing pattern of the second series of holes.

10. The tray of claim 9 wherein the first routing channel and first series of holes are configured to provide bend radius control of the cable if the cable is routed in a substantially elliptical path, said first channel and first series of holes being on opposite sides of the ellipse.

11. The tray of claim 9 wherein the second routing channel and second series of holes are configured to provide bend radius control of the cable if the cable is routed in a substantially elliptical path, said second channel and second series of holes being on opposite sides of the ellipse.

12. The tray of claim 7 which further comprises a plurality of jig pins that are inserted through the holes of the first and second series of holes that allow the cable to be routed around said jig pins.

13. A tray for holding cables comprising:
    a sheet of material;
    a first series of holes in the sheet of material that form a routing pattern having a predetermined minimum bend radius for the cable;
    a second series of holes in the sheet of material that for a routing pattern having a predetermined minimum bend radius for the cable that is different than the routing pattern of the first series of holes;
    clip that is attached to the sheet of material that holds the cable in place;
    a routing channel that provides a routing pattern having a predetermined minimum bend radius for the cable that substantially aligns with the routing pattern provided by the first series of holes;
    wherein the first routing channel and first series of holes are configured to provide bend radius control of the cable if the cable is routed in a substantially elliptical path, said first channel and first series of holes being on opposite sides of the ellipse; and
    wherein the clip is located at a point on the ellipse found between the first routing channel and the first series of holes.

14. The tray of claim 13 which further comprises a second clip that holds the cable and that is located on the opposite side of the ellipse as compared to the first clip.

15. The tray of claim 14 wherein said sheet of material is a piece of sheet metal that has a main body with a plurality of mounting flanges that extend from the main body in a vertical direction for mounting the tray to a housing.

16. The tray of claim 15 wherein the main body includes a transitional ramp so that the vertical distance between the mounting flanges and the main body is decreased.

17. The tray of claim 16 wherein the first routing channel is attached to the main body before the transitional ramp, ensuring that the routing channel does not extend vertically above the mounting flanges and wherein the first series of holes is located on the main body after the transitional ramp.

18. The tray of claim 17 wherein two of the mounting flanges are located on opposite sides of the tray and the first and second clips are attached to main body of the tray proximate to these mounting flanges, said clips being configured to allow insertion of the cable into the clips from the interior of the tray while preventing the cable from riding up onto the mounting flanges where the cable could be damaged when the tray is mounted to a housing.

19. A test instrument comprising:
   a first housing;
   a second housing;
   circuitry that is contained within said housing;
   a user interface that allows communication between the user and the test instrument; and
   a tray that has a first series of holes that establish a routing pattern for cable that has a predetermined minimum bend radius, a first jig pin that can be inserted into one of said holes allowing cable to be routed around said first jig pin, and an adhesive member that is adjacent to said hole that is empty after the first jig pin has been removed, said adhesive member engaging the cable and being attached to the tray, thereby holding the cable in place.

20. The test instrument of claim 19 wherein the tray is made from a single sheet of material that has been formed with a ramp that separates the tray into a deep portion and a shallow portion with said first series of holes being located on the shallow portion and which further comprises a first routing channel on the deep portion, said routing channel being substantially aligned with the routing pattern of the first series of holes allowing the cable to follow a first substantially circular or elliptical path.

21. The test instrument of claim 20 wherein the tray further comprises a second series of holes that establish a routing pattern that has a predetermined minimum bend radius that is located on its shallow portion and a second routing channel that is located on the deep portion of the tray that is substantially aligned with the routing pattern of the second series of holes allowing the cable to follow a second substantially circular or elliptical path that is different than the first path.

22. The test instrument of claim 21 wherein the cable is fiber optic cable.

23. The test instrument of claim 22 which further comprises a padded member that is placed on top of the tray to protect the cable from damage.

24. The test instrument of claim 21 which further comprises a plurality of jig pins that are inserted through the holes of the first and second series of holes that allow the cable to be routed around said jig pins.

* * * * *